(12) United States Patent
Yen

(10) Patent No.: US 9,483,137 B2
(45) Date of Patent: Nov. 1, 2016

(54) TOUCH MOUSE AND INPUT METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Tao-Cheng Yen, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 13 days.

(21) Appl. No.: 14/170,611

(22) Filed: Feb. 1, 2014

(65) Prior Publication Data

US 2014/0225833 A1   Aug. 14, 2014

(30) Foreign Application Priority Data

Feb. 8, 2013 (CN) .......................... 2013 1 0050239

(51) Int. Cl.
| | | |
|---|---|---|
| *G06F 3/033* | (2013.01) | |
| *G06F 3/041* | (2006.01) | |
| *G06F 3/0354* | (2013.01) | |

(52) U.S. Cl.
CPC ......... *G06F 3/0414* (2013.01); *G06F 3/03543* (2013.01)

(58) Field of Classification Search
CPC .................................................. G06F 3/03543
USPC ........... 345/173–179, 163; 178/18.01–18.11, 178/19.01
See application file for complete search history.

(56) References Cited

U.S. PATENT DOCUMENTS

| | | | | |
|---|---|---|---|---|
| 5,774,571 A | * | 6/1998 | Marshall ............... | G06F 3/0346 382/119 |
| 2002/0063688 A1 | * | 5/2002 | Shaw et al. .................. | 345/163 |
| 2006/0274042 A1 | * | 12/2006 | Krah et al. .................... | 345/163 |
| 2008/0284738 A1 | * | 11/2008 | Hovden et al. ............... | 345/173 |
| 2011/0221677 A1 | * | 9/2011 | Cavacuiti et al. ............ | 345/167 |
| 2013/0154933 A1 | * | 6/2013 | Sheik-Nainar ............... | 345/163 |

* cited by examiner

*Primary Examiner* — Kent Chang
*Assistant Examiner* — Scott Au
(74) *Attorney, Agent, or Firm* — Li & Cai Intellectual Property (USA) Office

(57) ABSTRACT

A touch mouse including a pressure sensing region, a touch sensing region, and a control unit is disclosed. The pressure sensing region is disposed at a first side and a second side of the touch mouse, and the touch sensing region covers at least the pressure sensing region at the first side. The first side is opposite to the second side. When the user clicks the pressure sensing region, it generates a pressure sensing signal. When the user clicks the touch sensing region, it generates a touch sensing signal. When the pressure sensing signal and the touch sensing signal are generated, the control unit outputs a first clicking signal representing that the first side is clicked. When the pressure sensing signal is generated but the touch sensing signal is not, the control unit outputs a second clicking signal representing that the second side is clicked.

10 Claims, 8 Drawing Sheets

RPIOR ART

RPIOR ART

TOUCH MOUSE AND INPUT METHOD THEREOF

BACKGROUND

1. Technical Field

The present disclosure relates to a touch mouse and an input method thereof; in particular, to a touch mouse and an input method thereof which simplify the processes for determining that the right or left button of the touch mouse is clicked.

2. Description of Related Art

Because the graphical user interface (GUI) is widely used, the user needs to use mouse for the convenience of operating the computers, thus the mouse is the common input device of normal computer. Please refer to FIGS. 1A and 1B. FIG. 1A shows an isometric top view of a conventional mouse, while FIG. 1B shows a bottom view of the conventional mouse. The mouse 1 includes a plurality of button regions 11 and a mouse roller 12. The button regions 11 can be mechanical buttons or touch-sensitive buttons, and the mouse roller 12 can be mechanical or touch-sensitive roller.

The mouse 1 further includes movement sensor 13 installed at the bottom of the body of the mouse 1. The movement sensor 13 may be a mechanical roller or an optical sensor. The mouse 1 can be connected to a host device (such as a computer) through the wired or wireless manners. The wired connection between mouse 1 and the host device can be accomplished through the use of an electrical cable, while the wireless connection can be established through wireless radio frequency (RF), the infrared ray (IR), or the Bluetooth connecting technique. If the mouse 1 is connected to the computer through wireless connection, a power supply device may be coupled to mouse 1 internally or externally (for example, a battery can be stored in the mouse 1) for providing the requisite operation electricity to the mouse 1.

Comparing with the conventional mouse in FIG. 1, presently, some manufacturers have improved the mouse 1 to provide a touch mouse which integrates the conventional mouse 1 and the touch control function. The touch sensing region of the present touch mouse, however, must cover touch regions of both the right and left buttons of the touch mouse. Thus, under this design, the area of the touch sensing region will be large, and the manufacturing cost is relatively higher. In addition, the microcontroller of the touch mouse is required to simultaneously determine the presence of touch signals from both the left and right touch regions (which respectively correspond to the left and right buttons) in order to recognize and output the correct clicking signal that represents a user's intended clicking command (e.g., whether the left side is clicked or the right side is clicked). Therefore, the processes for determining/interpreting the intended mouse clicking action (e.g., whether the right or the left side of the touch mouse is clicked) are complicated, which translate to the consumption of more computing power (and thus less processing efficiency).

SUMMARY

For reducing the area of required touch sensing region and simplifying the processes for determining the intended mouse clicking action (e.g., whether the left side or the right side of the touch mouse is clicked), the present disclosure provides a touch mouse that includes a pressure sensing region, a touch sensing region, and a control unit. The pressure sensing region is arranged toward a frontal portion of the touch mouse and spans laterally across a first side and a second side thereof the first side being opposite to the second side. The touch sensing region operably overlaps one side of the pressure sensing region (e.g., in a typical arrangement, the touch sensing region is overlappingly arranged in the left side portion of the pressure sensing region corresponding to a left clicking button of the mouse). When the user clicks the pressure sensing region, the pressure sensing region generates a pressure sensing signal. Likewise, when the user touches the touch sensing region, the touch sensing region generates a touch sensing signal. When both the pressure sensing signal and the touch sensing signal are generated, the control unit outputs a first clicking signal, which represents that the first side is clicked. When only the pressure sensing signal is generated but the touch sensing signal is not generated, the control unit outputs a second clicking signal, which represents that the second side is clicked.

For reducing the area of the touch sensing region and simplifying the processes for determining whether the left side or the right side of the touch mouse is clicked, the present disclosure further provides an input method applied to the touch mouse. The touch mouse has a pressure sensing region and a touch sensing region, wherein the pressure sensing region is disposed at a first side and a second side which is opposite to the first side of the touch mouse, and the touch sensing region covers at least the pressure sensing region at the first side. The input method includes the following steps. Firstly, the pressure sensing region and the touch sensing region are detected. When the user clicks the pressure sensing region, the pressure sensing region generates a pressure sensing signal, and when the user touches the touch sensing region, the touch sensing region generates a touch sensing signal. After that, the pressure sensing signal and the touch sensing signal generated is detected, a first clicking signal which represents that the first side is clicked is output when touch sensing region is disposed on first side. When the pressure sensing signal is generated but the touch sensing signal is not generated is detected, the second clicking signal which represents that the second side is clicked is output.

To sum up, the touch mouse and the input method thereof provided by the present disclosure can reduce the area of the touch sensing region, and can simplify the processes executed by the control unit for determining whether the right side or the left side of the touch mouse is clicked, such that the cost and the complexity of the control unit for determining whether the left side or the right side of the touch mouse is clicked or not are reduced.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE EXEMPLARY EMBODIMENTS

For reducing the area of the touch sensing region, and simplifying the processes executed by the control unit for determining whether the right side or the left side of the touch mouse is clicked, the present disclosure provides an improved touch mouse and an input method thereof. In order to make the contents of the present disclosure clearer, the following descriptions show several embodiments which can surely be implemented by using the present disclosure.

Embodiment of Touch Mouse

Figure 1A:
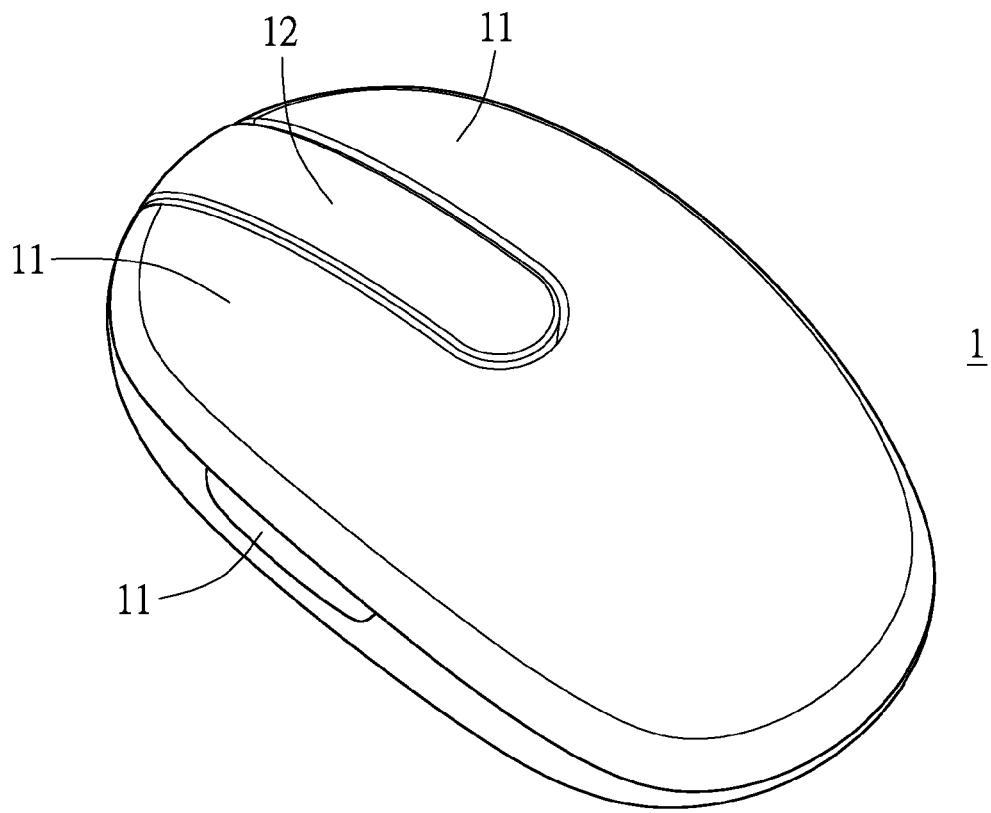
FIG. 1A shows a front view diagram of the conventional mouse device.
Figure 1B:
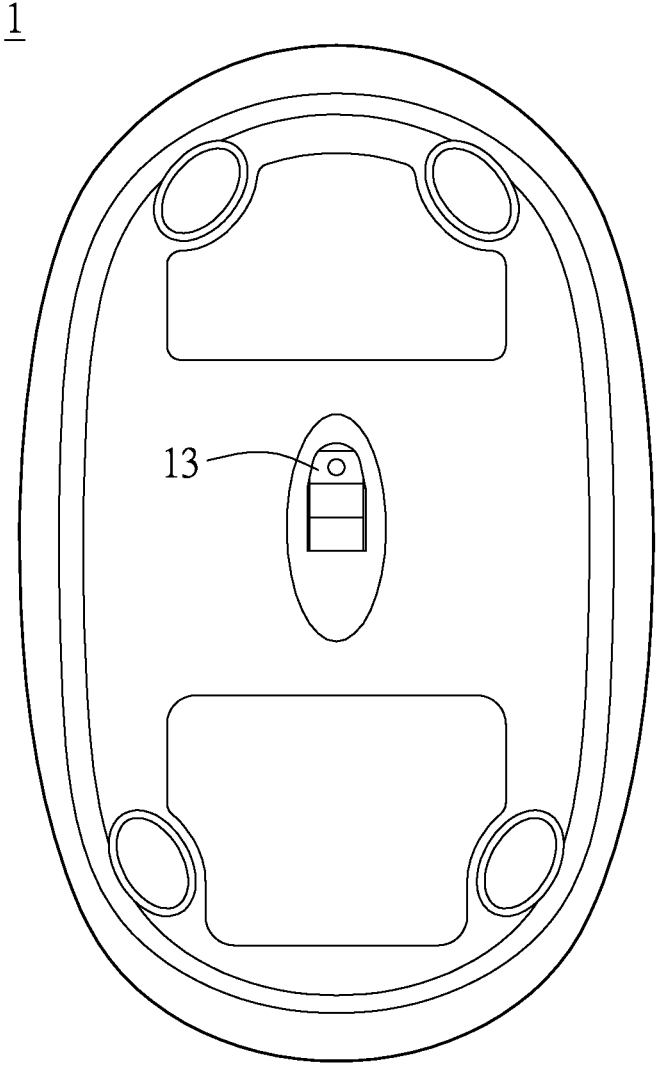
FIG. 1B shows a bottom view diagram of the conventional mouse device.
Figure 2:
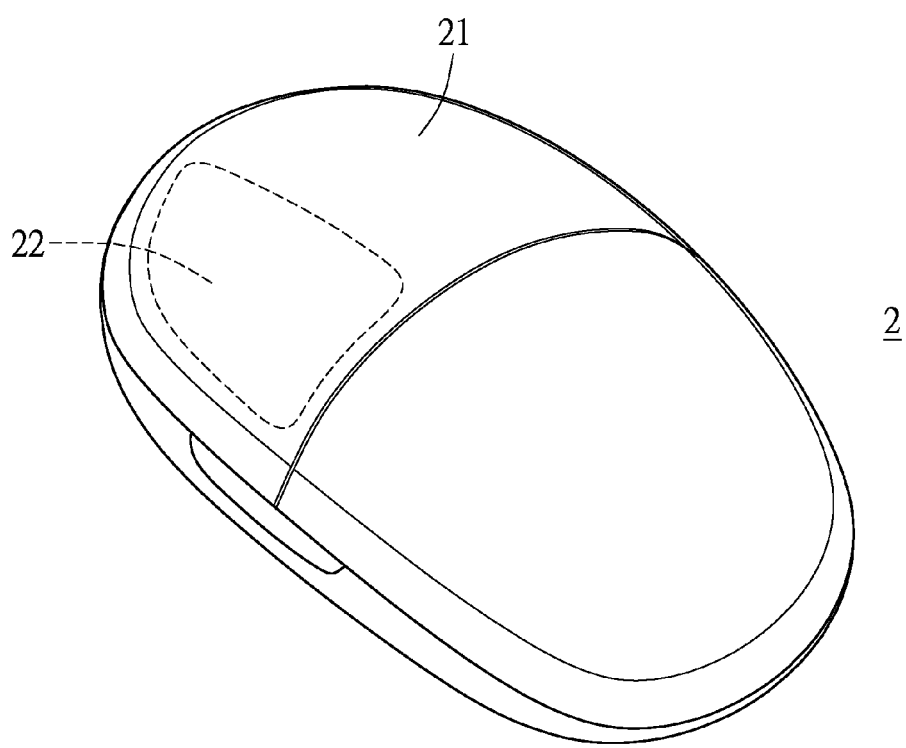
FIG. 2 shows a front view diagram of a touch mouse according to an embodiment of the present disclosure.

Please refer to FIG. 2 which shows a front view diagram of a touch mouse according to an embodiment of the present disclosure. In this embodiment, the touch mouse 2 includes a pressure sensing region 21, a touch sensing region 22, and a control unit (not shown in FIG. 2). There has at least one bottom switch (not shown in FIG. 2). under the pressure region 21. The pressure sensing region 21 is disposed at the front region of the upper surface of the touch mouse 2, and extends from a first side (such as the left side) of the touch mouse 2 to a second side (such as the right side) of the touch mouse 2. The touch sensing region 22 could be designed to cover at least the pressure sensing region 21 at the first side or right side. In this embodiment, the touch sensing region 22 is disposed at the first side of the touch mouse 2 only. No matter which side of pressure region is, there has at least one bottom switch (not shown in FIG. 2) to be triggered when user clicks the pressure region.

The pressure sensing region 21 is for sensing the clicking operation of the user. When the user clicks the pressure sensing region 21, the pressure sensing region 21 generates a pressure sensing signal. The touch sensing region 22 is for sensing the touch operation of the user. When the user touches the touch sensing region 22, the touch sensing region 22 generates a touch sensing signal. Thus, when the user clicks the overlapping region of the touch sensing region 22 and the pressure sensing region 21, the touch sensing signal and the pressure sensing signal are generated simultaneously.

For example, when both the pressure sensing signal and the touch sensing signal are generated, the control unit may output a first clicking signal which represents that the first side of the touch mouse 2 is clicked if the touch sensing is disposed on first side of touch mouse 2; If the user only clicks the pressure sensing region 21 at right side without touch the touch sensing region 22, the touch mouse 2 only outputs the right clicking signal. However, when the pressure sensing signal is generated but the touch sensing signal is not generated, the control unit outputs a second clicking signal which represents that the second side of the touch mouse 2 is clicked. In other words, when the user touches the touch sensing region 22 at the first side and clicks the pressure sensing region 21, the touch mouse 2 outputs the first clicking signal. On the other hand, when the user clicks the pressure sensing region 21 only without touching the touch sensing region 22, the touch mouse 2 outputs the second clicking signal. Besides, the pressure sensing region 21 can be a mechanical micro-switch, a sensitive sensor, or a pressure sensor of the other type. The touch sensing region 22 can be a resistive touch sensing region, a capacitive touch sensing region, an ultrasonic touch sensing region, an optical (infrared) touch sensing region, or a touch sensing region of the other type. Briefly speaking, the implementations of the pressure sensing region 21 and the touch sensing region 22 are not for limiting the scope of the present disclosure.

In addition, the touch mouse 2 is further has with mouse roller installed at the middle of the touch mouse 2, for the sake of operation convenience. The touch mouse 2 further has a movement sensor installed at the bottom of the touch mouse 2, and the movement sensor can be a mechanical roller or an optical sensor. In addition, the touch mouse 2 and the computer can be connected with each other through wired or wireless manners. Please be noted that the components at the body of the touch mouse 2 and the appearance of the touch mouse 2 are not for limiting the scope of the present disclosure.

It's worth noting that the touch mouse 2 in FIG. 2 is designed for the right-handed user, thus the first side and the second side are respectively the left side and the right side. However, the present disclosure is not limited thereto. For example, if the touch mouse 2 is designed for the left-handed user, the first side and the second side can be changed to the right side and the left side respectively.

Embodiment of Input Method of Touch Mouse

Figure 3:
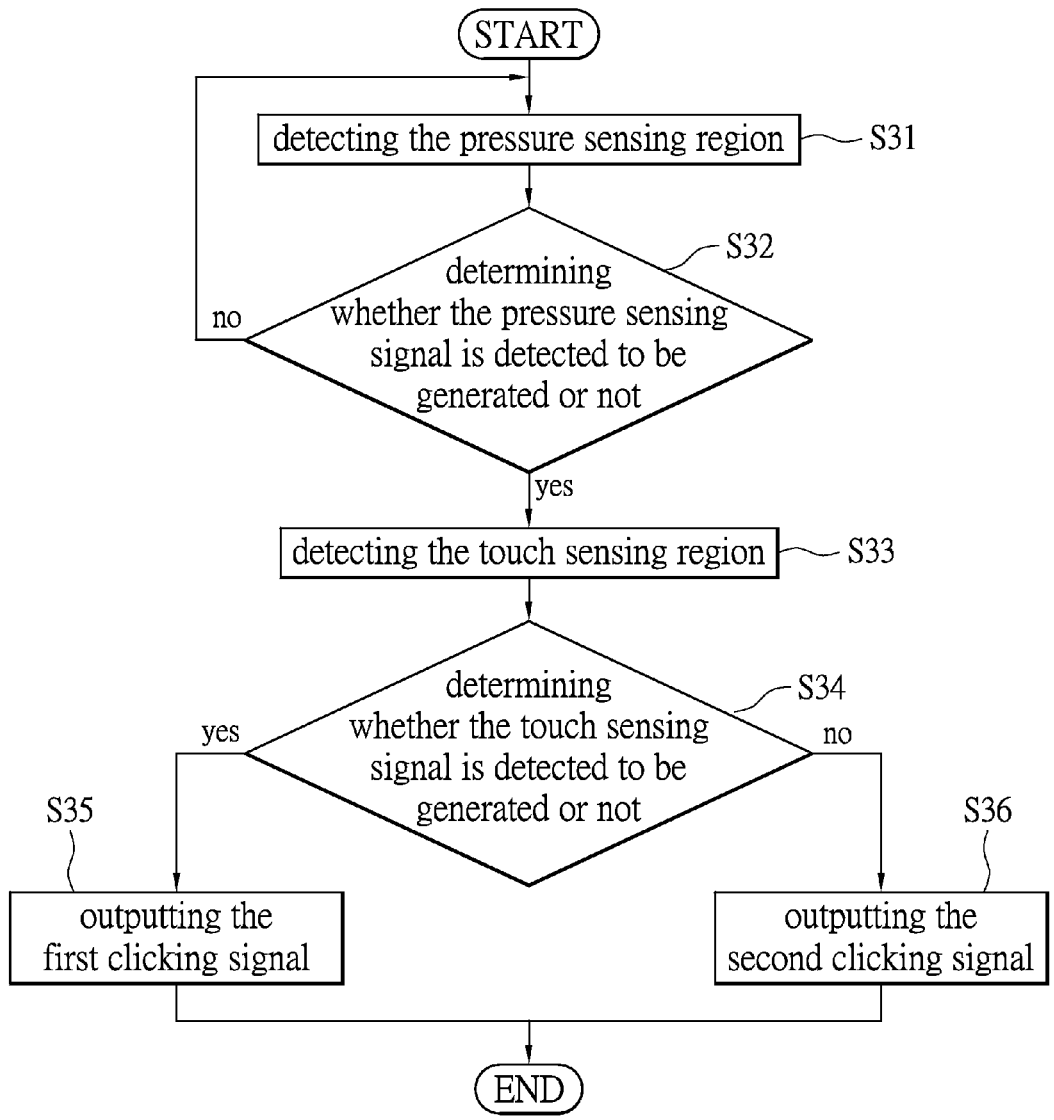
FIG. 3 shows a flow chart of an input method of a touch mouse according to an embodiment of the present disclosure.

Please refer to FIGS. 2 and 3. FIG. 3 shows a flow chart of an input method of a touch mouse according to an embodiment of the present disclosure. Firstly, at step S31, the pressure sensing region 21 of the touch mouse 2 is detected. After that, at step S32, the control unit of the touch mouse 2 determines whether the pressure sensing signal is detected to be generated or not. If the pressure sensing signal is not generated, step S31 will be executed again. If the pressure sensing signal is generated, step S33 will be executed.

At step S33, the touch sensing region 22 of the touch mouse 2 is detected. Then at step S34, the control unit of the touch mouse 2 determines whether the touch sensing signal is detected to be generated or not. If the touch sensing signal is detected to be generated, step S35 will be executed. If the touch sensing signal is not generated, step S36 will be executed.

At step S35, the control unit of the touch mouse 2 outputs the first clicking signal, and the input method is ended this time. At step S36, the control unit of the touch mouse 2 outputs the second clicking signal, and the input method is ended this time.

From the above descriptions, it can be known that when the user touches the touch sensing region 22 at the first side and clicks the pressure sensing region 21, the touch mouse 2 outputs the first clicking signal. However, when the user clicks the pressure sensing region 21 only without touching the touch sensing region 22, the touch mouse 2 outputs the second clicking signal. In addition, it is worth explaining that step S33 can also be combined into step S31, and the input method shown in FIG. 3 is not for limiting the scope of the present disclosure.

Embodiment of Another Input Method of Touch Mouse

Figure 4:
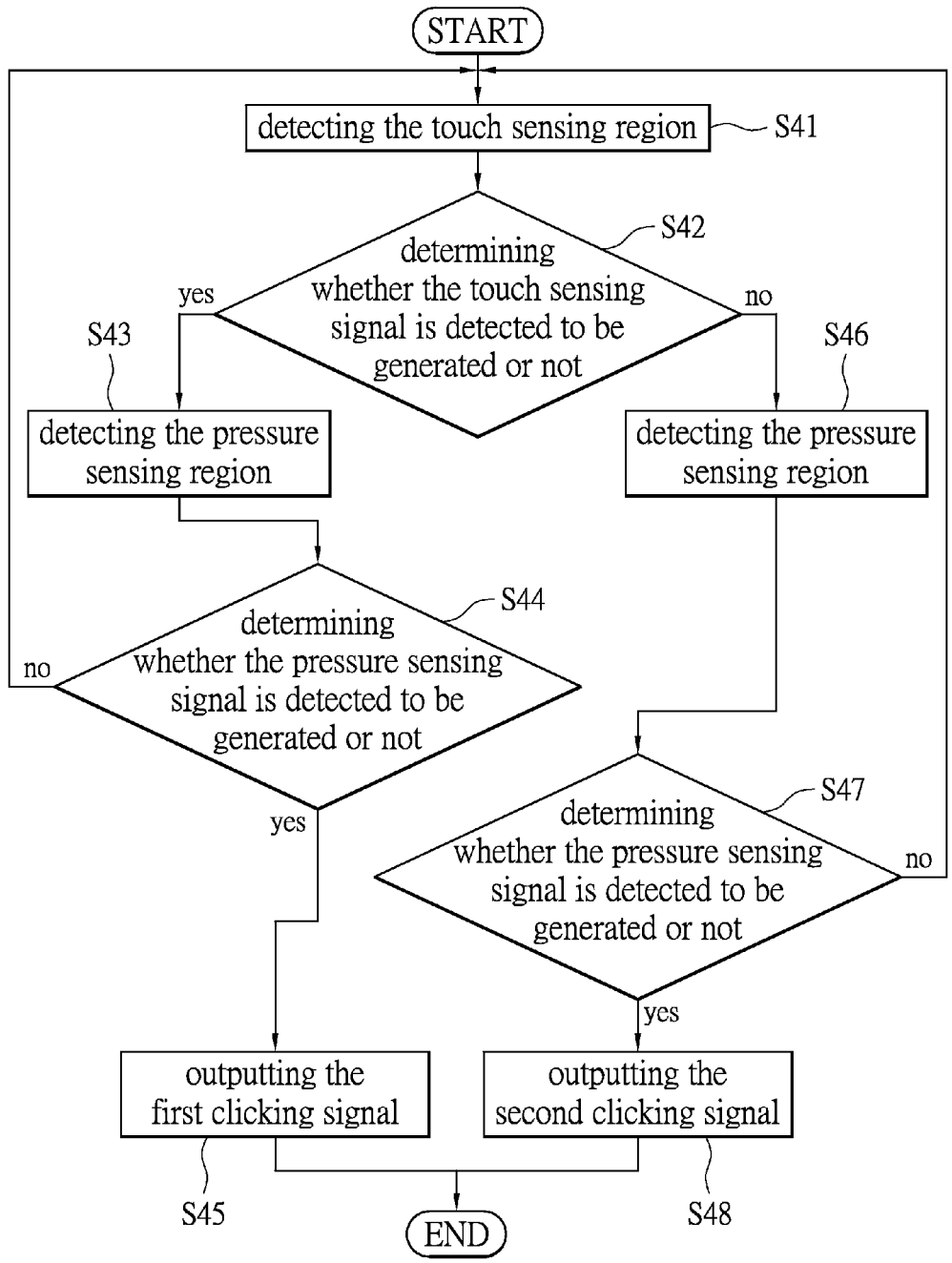
FIG. 4 shows a flow chart of an input method of a touch mouse according to another embodiment of the present disclosure.

Please refer to FIGS. 2 and 4. FIG. 4 shows a flow chart of an input method of a touch mouse according to another embodiment of the present disclosure. Firstly, at step S42, the touch sensing region 22 of the touch mouse 2 is detected. After that, at step S42, the control unit of the touch mouse 2 determines whether the touch sensing signal is detected to be generated or not. If the touch sensing signal is detected to be generated, step S43 is then executed. If the touch sensing signal is not generated, step S46 is then executed.

At step S43, the pressure sensing region 21 of the touch mouse 2 is detected. Then, at step S44, the touch mouse 2 determines whether the pressure sensing signal is detected to be generated or not. If the pressure sensing signal is not detected to be generated, the step S41 will be executed again. If the pressure sensing signal is detected to be generated, the step S45 will be executed. After that, at step S45, the control unit of the touch mouse 2 outputs a first clicking signal, and then the input method is ended this time.

At step S46, the pressure sensing region 21 of the touch mouse 2 is detected. After that, at step S47, the control unit of the touch mouse 2 determines whether the pressure sensing signal is detected to be generated or not. If the pressure sensing signal is not generated, step S41 will be executed again. If the pressure sensing signal is detected to be generated, step S48 will be executed. Then, at step S48, the control unit of the touch mouse 2 outputs a second clicking signal, and the input method is ended this time.

The difference between the FIGS. 3 and 4 is that the determination orders for determining the generations of the pressure sensing signal and the touch sensing signal are different. In addition, step S43 and step S46 can be combined into the step S41. Briefly speaking, the order of steps of the input method herein is not for limiting the scope of the present disclosure.

Another Embodiment of Touch Mouse

Figure 5:
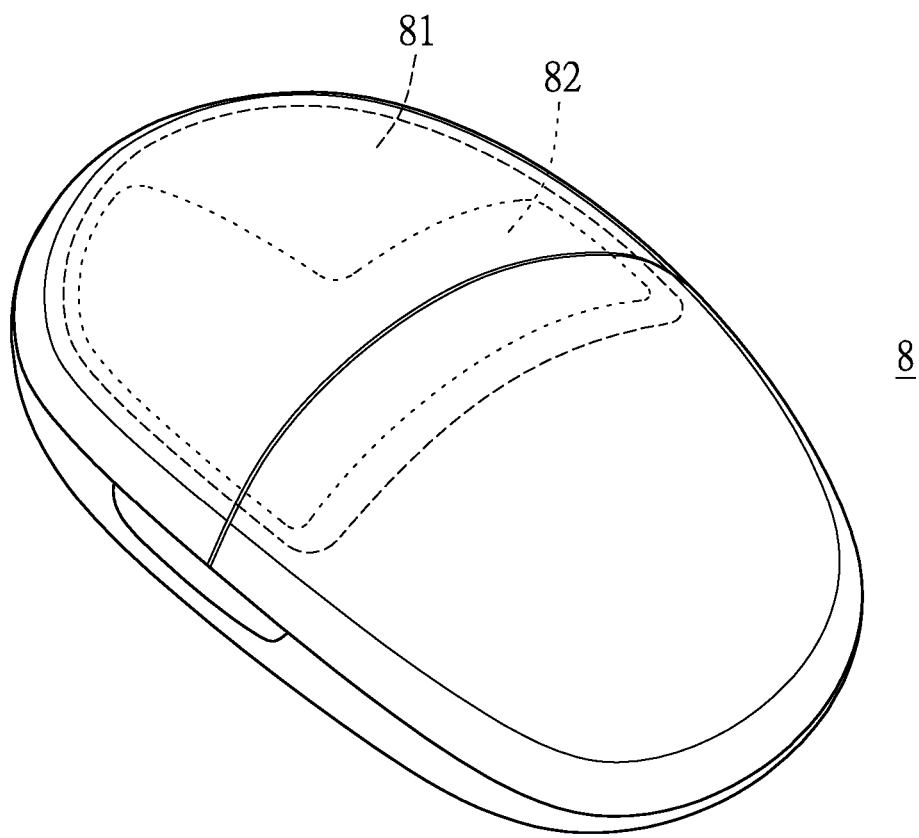
FIG. 5 shows a front view diagram of a touch mouse according to another embodiment of the present disclosure.

Please refer to FIG. 5 which shows anisometric view of a touch mouse according to another embodiment of the present disclosure. Comparing with the touch mouse 2 in FIG. 2, the touch sensing region 82 of the touch mouse 8 in FIG. 8 is an L shape region, and the touch sensing region 82 covers at least part of the pressure sensing region 81. For example, the touch sensing region 82 completely covers the pressure sensing region 81 at the first side, and partly covers the pressure sensing region 81 at the second side, thus the overlapping region 83 of the pressure second region 81 and the touch sensing region 82 is also an L shape region. The pressure sensing region 81 is the same as the pressure sensing region 21 of the touch mouse 2 in FIG. 2, but the one skilled in the art can choose to use the pressure sensing region 51 in FIG. 5 for implementing the pressure sensing region 81.

When the user touches the touch sensing region 82 at the first side, the touch mouse 8 outputs the first clicking signal. On the other hand, when the user only clicks the pressure sensing region 81 without touching the touch sensing region 82, the touch mouse 8 outputs the second clicking signal.

Figure 6A:
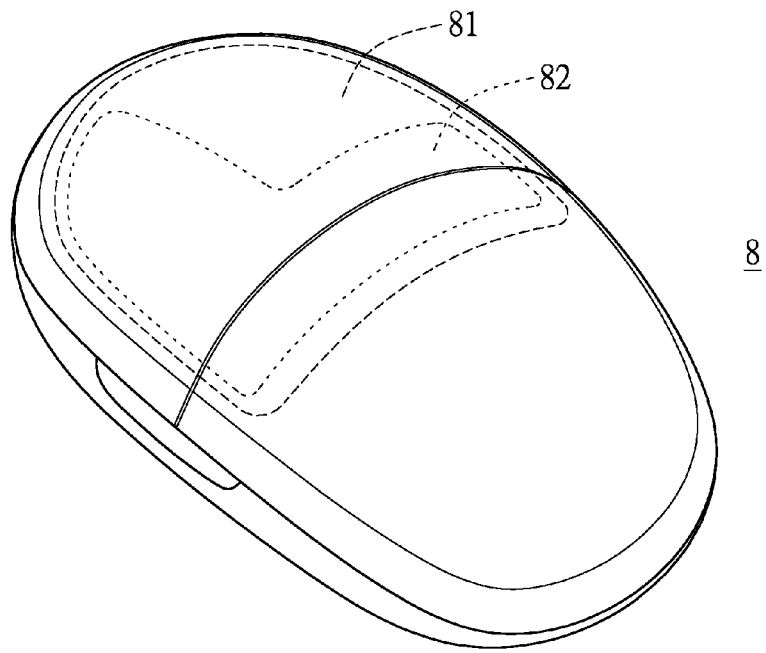
FIG. 6A shows a schematic diagram of a touch mouse which does not output the first and second clicking signals according to an embodiment of the present disclosure.

Please refer to FIG. 6A which shows a schematic diagram of a touch mouse which does not output the first and second clicking signals. In FIG. 9A, the touch mouse can be one of the touch mice of the above embodiments. Because the first and the second sides of the touch mouse are not clicked, thus the first and the second clicking signals are not generated.

Figure 6B:
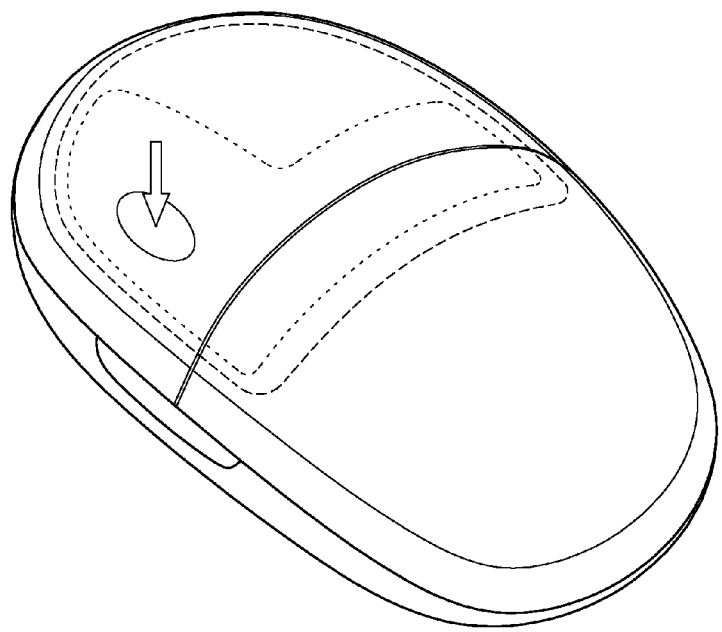
FIG. 6B shows a schematic diagram of a touch mouse which outputs the first clicking signal according to an embodiment of the present disclosure.

Then, please refer to FIG. 6B which shows a schematic diagram of a touch mouse which outputs the first clicking signal according to an embodiment of the present disclosure. In FIG. 9B, the touch mouse can be one of the touch mice of the above embodiments. Because the first side of the touch mouse is clicked and the touch sensing region is touched, the touch mouse outputs the first clicking signal.

Figure 6C:
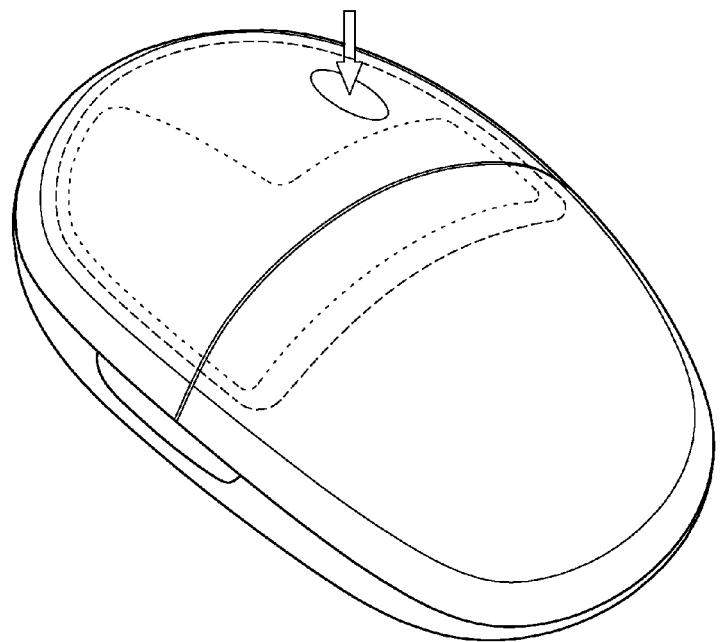
FIG. 6C shows a schematic diagram of a touch mouse which outputs the second clicking signal according to an embodiment of the present disclosure.

FIG. 6C shows a schematic diagram of a touch mouse which outputs the second clicking signal according to an embodiment of the present disclosure. In FIG. 6C, the touch mouse can be one of the touch mice of the above embodiments. Because the second side of the touch mouse is clicked but the touch sensing region is not touched, the touch mouse outputs the second clicking signal.

Figure 6D:
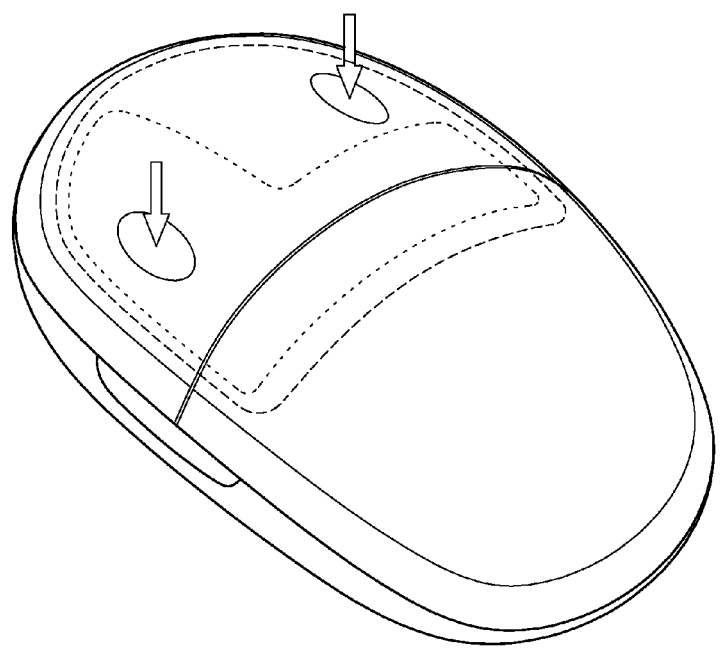
FIG. 6D shows a schematic diagram of a touch mouse which outputs the first clicking signal according to another embodiment of the present disclosure.

FIG. 6D shows a schematic diagram of a touch mouse which outputs the second clicking signal according to an embodiment of the present disclosure. In FIG. 6D, the touch mouse can be one of the touch mice of the above embodiments. Because the first and the second sides of the touch mouse are clicked, and the touch sensing region is touched on the first side, the touch mouse outputs the first clicking signal.

To sum up, the touch mouse and the input method thereof provided by the embodiments of the present disclosure can reduce the area of the touch sensing region, and simplify the processes of the control unit for determining whether the left or right side of the touch mouse is clicked or not, in order to achieve the objectives of reducing cost and the complexity of the determination for determining whether the left side or the right side of the touch mouse is clicked.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:
1. A touch mouse, comprising:
  a pressure sensing region arranged toward a frontal portion of the touch mouse spanning laterally across a first side and a second side opposite to the first side, configured to generate a pressure sensing signal when a user clicks the pressure sensing region;
  a touch sensing region, at least partially overlapping one of the first and second sides of the pressure sensing region, configured to generate a touch sensing signal when the user touches the touch sensing region; and
  a control unit configured to:
    output a first touch sensing signal representing a clicking action on the first side when the user clicks an overlapping region of the touch sensing region and the pressure sensing region, the touch sensing signal and the pressure sensing signal are generated simultaneously;

output a second sensing signal representing a clicking action on the second side when only the pressure sensing signal is generated but the touch sensing signal is not generated.

2. The touch mouse according to claim 1, wherein the control unit firstly determines whether the pressure sensing region generates the pressure sensing signal or not, and if the pressure sensing region generates the pressure sensing signal, the control unit then determines whether the touch sensing region generates the touch sensing signal or not.

3. The touch mouse according to claim 1, wherein the control unit firstly determines whether the touch sensing region generates the touch sensing signal or not, and if the touch sensing region generates the touch sensing signal, the control unit then determines whether the pressure sensing region generates the pressure sensing signal or not.

4. The touch mouse according to claim 1, wherein the touch sensing region is an L shape region.

5. An input method, applied to a touch mouse, wherein the touch mouse has a pressure sensing region and a touch sensing region, the pressure sensing region is disposed at a first side of the touch mouse and a second side which is opposite to the first side, and the touch sensing region at least partially covers the pressure sensing region which is disposed at the first side, and the input method comprises:

detecting the pressure sensing region and the touch sensing region, wherein when a user clicks the pressure sensing region, the pressure sensing region generates a pressure sensing signal, and when the user touches the touch sensing region, the touch sensing region generates a touch sensing signal;

when that the pressure sensing signal and the touch sensing signal are simultaneously generated is detected, outputting a first clicking signal which represents that the user clicks an overlapping region of the touch sensing region and the pressure sensing region and that the first side is clicked; and when that the pressure sensing signal is generated but the touch sensing signal is not generated is detected, outputting a second clicking signal which represents that the second side is clicked, wherein the first side is opposite to the second side.

6. The input method according to claim 5, wherein whether the pressure sensing region generates the pressure sensing signal or not is firstly determined, if the pressure sensing region generates the pressure sensing signal, whether the touch sensing region generates the touch sensing signal or not is then determined.

7. The input method according to claim 5, wherein whether the touch sensing region generates the touch sensing signal or not is firstly determined, if the touch sensing region generates the touch sensing signal, whether the pressure sensing region generates the pressure sensing signal or not is then determined.

8. The input method according to claim 5, wherein the touch sensing region is an L shape region.

9. The input method according to claim 5, wherein the pressure sensing region includes a first pressure sensing region and a second pressure sensing region, and the first pressure sensing region and the second pressure sensing region are respectively disposed at the first side and the second side, when the user clicks the first pressure sensing region, the first pressure sensing region generates a first pressure sensing signal, and when the user clicks the second pressure sensing region, the second pressure sensing region generates a second pressure sensing signal, wherein the pressure sensing signal includes the first pressure sensing signal and the second pressure sensing signal.

10. The input method according to claim 5, wherein the first side and the second side are respectively a left side and a right side, or the first and the second sides are respectively the right side and the left side.

* * * * *